United States Patent [19]

Reynolds et al.

[11] 4,304,673

[45] Dec. 8, 1981

[54] WASTEWATER TREATMENT PROCESS

[75] Inventors: James H. Reynolds, Hyde Park; V. Dean Adams, Logan, both of Utah

[73] Assignee: International Environmental, Inc., Salt Lake City, Utah

[21] Appl. No.: 138,214

[22] Filed: Apr. 7, 1980

[51] Int. Cl.³ .............................................. C02F 1/72
[52] U.S. Cl. .................................. 210/721; 210/758; 210/764; 424/162; 422/28
[58] Field of Search ....................... 210/50, 64, 62, 59, 210/63 R, 60, 192, 80, 61; 424/162; 422/28; 423/539, 542, 543, 166

[56] References Cited

U.S. PATENT DOCUMENTS

| | | | |
|---|---|---|---|
| 1,229,305 | 6/1917 | Menzies | 210/752 |
| 1,543,939 | 6/1925 | Machlachlan | 210/18 |
| 1,551,418 | 10/1925 | Machlachlan | 210/18 |
| 2,069,621 | 2/1937 | Patrick | 210/80 |
| 2,134,679 | 11/1938 | Allen | 424/162 |
| 2,171,203 | 8/1939 | Urbain et al. | 210/63 R |
| 2,728,726 | 12/1955 | Bassett | 210/64 |
| 3,522,173 | 7/1970 | Lindman et al. | 210/49 |
| 3,690,860 | 9/1972 | Salutsky et al. | 424/162 |
| 3,948,774 | 4/1976 | Lindman | 210/192 |
| 4,123,355 | 10/1978 | Poradek et al. | 210/60 |

FOREIGN PATENT DOCUMENTS

| | | | |
|---|---|---|---|
| 532974 | 11/1956 | Canada | 424/162 |
| 1156172 | 5/1958 | France | 422/28 |
| 673615 | 7/1979 | U.S.S.R. | 210/752 |

OTHER PUBLICATIONS

M. B. Kim-E et al., "Reclamation of Hyperion Secondary Effluent by Reverse Osmosis", UCLA School of Eng. & Appl. Sci., Jun. 1975 (pp. 66–72).
A. J. Lingg, "Potential of Sulphur Dioxide for Disinfection of Waste Water".
Skinner et al., "Inhibition and Inactivation of Vegetative Microbes", Academic Press, (pp. 89–110), 1976.
Rahn et al., "Effect of Increase in Acidity on Antiseptic Efficiency", Ind. & Eng. Chem. vol. 36, 2, pp. 185–187. (1944).

*Primary Examiner*—Benoit Castel
*Attorney, Agent, or Firm*—Lyon & Lyon

[57] ABSTRACT

Wastewater is continuously disinfected by combining the wastewater with sufficient $SO_2$ that the wastewater has a selected free $SO_2$ content of at least 5 mg/liter. The combined $SO_2$/wastewater is maintained at the selected free $SO_2$ content for at least about 10 minutes. The wastewater can be treated by dissolving $SO_2$ into a first portion of the wastewater and combining the first portion with $SO_2$ dissolved therein with a second portion of the wastewater stream.

27 Claims, 5 Drawing Figures

FIG_5.

WASTEWATER TREATMENT PROCESS

BACKGROUND

The present invention is directed to the field of disinfecting wastewater.

The pollution problem posed by the disposal of wastewater from domestic and industrial sewage is a serious problem, especially in densely populated areas. In such areas, literally millions of gallons of untreated or inadequately treated wastewater from domestic and industrial sewage is discharged into streams, lakes, and the like. The discharge of such inadequately treated wastewater can cause severe health problems as well as being esthetically most undesirable. A variety of infectious microorganisms are found in municipal wastewaters, which, if the water is not disinfected, can be outbreaks of gastroenteritis, salmonellosis, shigellosis, typhoid, ear infections from *Pseudomonas aeruginosa,* and infectious heptatitis.

Chlorine has been traditionally employed for disinfecting water and wastewater. However, recent reports concerning the carcinogenic effects of chlorinated compounds resulting from chlorine disinfection have stimulated the search for less potentially harmful disinfectants. It has been found that the indiscriminate chlorination of wastewaters results in the formation of halogenated compounds which are toxic to aquatic life and potentially toxic to humans. Further, chlorination can satisfy prospective Federal water discharge standards only with such high dosages that expensive dechlorination is required as a further process step.

Researchers have investigated the use of ozone, chloride dioxide, ultra-violet light, iodine, bromine, and bromine chloride as possible alternatives to chlorine disinfection of wastewater. Although all of these alternatives are effective in disinfecting water and wastewater to various degrees, n general, these alternatives are more costly than the use of chlorine. Thus, there is an urgent need to develop an effective, low cost, alternative disinfectant which meets current and future Federal, state, and local water pollution standards.

$SO_2$ has long been known to the food processing and wine industries for disinfection of equipment and beverages. For example, U.S. Pat. No. 623,105 issued Apr. 11, 1899 describes purifying sugar syrup by passing $SO_2$ into the syrup. Further, the use of $SO_2$ for purification of wastewater is described in U.S. Pat. Nos. 2,171,203, 3,522,173, 3,948,774, and 4,123,355.

The use of $SO_2$ for disinfecting wastewater is an economically attractive alternative to the use of chlorine for disinfecting wastewater, without the problem of generation of chlorinated carcinogenic compounds. However, none of the processes described in the aforementioned patents has achieved any significant acceptance. The processes have not demonstrated on any large scale the ability to meet the 1983 U.S. Environmental Protection Agency's standards for water discharge for irrigation, recreation, and industrial use. This is most likely the result of a lack of a fundamental understanding of how a process utilizing $SO_2$ for disinfecting wastewater is to be controlled and operated for efficient and effective disinfection.

Therefore, is it clear that there is an urgent need for an effective, low cost, and efficient process for disinfecting wastewater utilizing $SO_2$.

SUMMARY

The invention is directed to a process having the above-identified features. The invention is based upon the use of new techniques for disinfecting wastewater with $SO_2$. Further, the invention is based on the fundamental principle that in disinfecting wastewater with $SO_2$, it is essential to operate the process to maintain the free $SO_2$ content of the wastewater in a selected effective range and maintain the contact time between the wastewater and the free $SO_2$ above a minimum effective time.

According to the present invention, wastewater is continuously disinfected by combining the wastewater with sufficient $SO_2$ so that the wastewater has a free $SO_2$ content no less than a selected free $SO_2$ content of at least about 5 mg/liter. Preferably the selected free $SO_2$ content is at least about 30 mg/liter and is less than about 200 mg/liter, and more preferably less than about 150 mg/liter. The $SO_2$ wastewater is maintained in a treatment zone at the selected free $SO_2$ content for at least about 10 minutes. The residence time in the treatment zone required for disinfecting the wastewater increases as the free $SO_2$ content of the wastewater decreases.

The treated wastewater is then withdrawn from the treatment zone for further processing, such as neutralization and aeration.

The wastewater stream can be treated by introducing the wastewater and $SO_2$ into a gas-liquid contactor. Alternatively, the wastewater can be combined with an aqueous stream containing dissolved $SO_2$. The aqueous stream can comprise disinfected wastewater from the process, and/or make-up water from an independent source.

In one version of the present invention, only a first portion of the wastewater is introduced into a gas-liquid contact zone into which $SO_2$ containing gas is also introduced. This results in at least a portion of the $SO_2$ being dissolved into the first portion of the wastewater. Then a second portion of the wastewater is combined with $SO_2$ by introducing substantially all of the first portion of the wastewater containing $SO_2$ directly into a mixing zone, and introducing a second portion of the wastewater into the mixing zone. Sufficient $SO_2$ is introduced into the contact zone so that the wastewater in the mixing zone has a free $SO_2$ content no less than a selected free $SO_2$ content of at least about 5 mg/liter. The wastewater is maintained at the selected free $SO_2$ content for at least about 10 minutes to obtain adequate disinfection.

An advantage of this "split" stream process is that only a portion of the wastewater need to passed through the gas-liquid contactor. This helps minimize the fouling that can occur when using gas-liquid contactors such as packed towers.

The process of the present invention is useful for effectively and efficiently disinfecting wastewater streams, even those having high BOD (Biochemical Oxygen Demand) and high COD (Chemical Oxygen Demand) values. The disinfected water produced is relatively clear and odor-free. Further, because chlorine is not used in the process, carcinogens produced with chlorine disinfection are not a problem.

DRAWINGS

These and other features, aspects, and advantages of the present invention will become better understood with reference to the following description, appended claims, and accompanying drawings where:

DESCRIPTION

The present invention is directed to a process for disinfecting wastewater. The term "wastewater" as used herein is intended to mean any water requiring disinfection, including for example industrial, agricultural, and domestic water, and some potable waters. The process can be useful for disinfection of potable water systems where a disinfection residual effect is not required. This especially applies to countries other than the United States.

The process of the present invention is principally directed to disinfecting water which has been derived from domestic sewage, i.e. sewage derived principally from dwellings, business buildings, institutions, and the like, which water can contain ground water, surface water, and/or storm water. Generally the wastewater treated has already undergone primary and secondary treatment according to conventional treatment processes. Surfactants and other materials can be added to the wastewater to enhance solution of sulfur dioxide added in the process of the present invention, and to minimize scale build-up. Generally speaking, the wastewater from domestic sewage has a biochemical oxygen demand of about 250 parts per million and contains approximately 250 parts per million of suspended solids, organic solids constituting 40 to 50 percent of the total solids.

Figure 1:
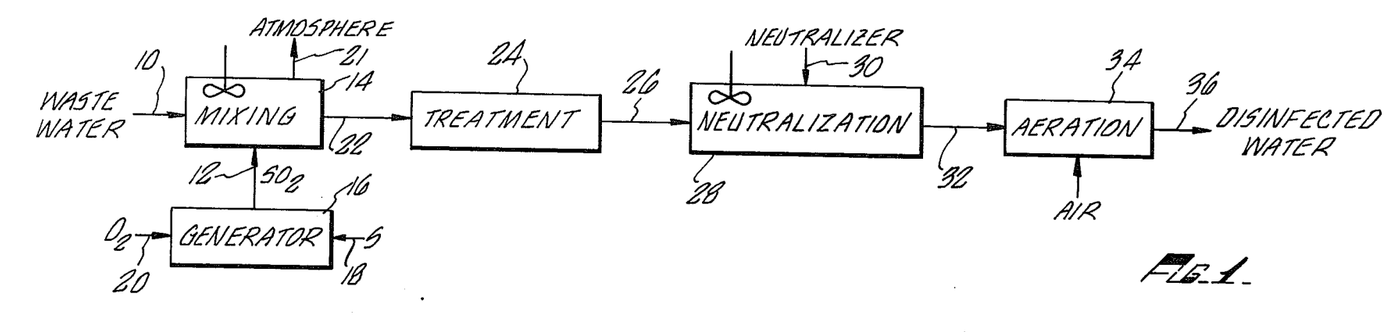
FIG. 1 is a flow sheet of a process according to the present invention.

In a continuous process according to the present invention, with reference to FIG. 1, wastewater 10 is combined with sulfur dioxide containing combination gas 12 in an agitated mixing zone 14. The sulfur dioxide containing combination gas can be produced in a sulfur dioxide generator 16 by burning elemental sulfur 18 in the presence of oxygen 20. Alternatively, the gas containing $SO_2$ can be obtained from other suitable sources such as stack gas. The combined sulfur dioxide/wastewater 22 is withdrawn from the mixing zone 14 and passed to a treatment zone 24 which provides a residence time of at least about 10 minutes. Wastewater is withdrawn from the treatment zone and passed via line 26 to an agitated neutralization zone 28 where it is combined with a neutralizing agent 30 such as calcium oxide. The neutralized treated waste water 32 is then aerated in an aeration zone 34.

The individual steps of the process shown in FIG. 1 will now be described in detail.

The generator 16 used for burning elemental sulfur 18 can be a conventional burner such as spray, cascade, rotary, or pan burner. The burner can be fed with solid or liquid sulfur. Burners particularly useful for producing sulfur dioxide which is to be absorbed by a water stream are described in U.S. Pat. Nos. 3,627,134, 3,907,510, and 4,039,289.

The source of the oxygen 20 used for burning sulfur is generally air, although air enriched with oxygen can be used.

Preferably the sulfur 18 is burned in the presence of the minimum amount of oxygen 20 required to insure substantially complete oxidation of sulfur to sulfur dioxide. Generally, this is about twice stoichiometric. Thus, the combustion gas 12 produced comprises sulfur dioxide and no more than about 10% by volume oxygen. The sulfur dioxide 12 is preferably introduced into the mixing zone 14 without any additional oxygen. The reason for minimizing the amount of oxygen in the combustion gas is that introduction of oxygen into the waste water can strip out $SO_2$ from the wastewater and adversely affect the disinfection process.

Any constituents of the $SO_2$ containing combustion gas not dissolved in the mixing zone 14 are discharged via line 21 to the atmosphere. This can safely be done since substantially all of the $SO_2$ is dissolved in the wastewater in the mixing zone 14.

Rather than generating the sulfur dioxide on site at the wastewater disinfection plant, sulfur dioxide can be provided from off site facilities. Sulfur dioxide is usually compressed into a liquid and stored and shipped in steel containers. The sulfur dioxide can be dissolved in the wastewater from the containers in a sulfonator such as those sold by Wallace & Tiernan Division of Pennwalt Corporation.

Numerous types of gas-liquid mixing apparatuses 14 can be employed in the process of the present invention. For example, spray systems such as spray towers and packed towers having cross-flow, counter-flow, or cocurrent flow can be used. Particularly preferred gas-liquid contactors are packed columns to which the wastewater scrubbing medium is introduced at the upper part of the column, as in the form of a spray, passing downwardly through a suitably packed column. The downwardly flowing wastewater contacts a counterflowing gas stream moving upwardly through the column. A particularly preferred packing is polyvinylchloride pipe, one inch outer diameter and one inch long.

Other types of scrubbers can also be used, the main criterion being that the scrubber allows sufficient contact time between the gas 12 and the wastewater 10 to ensure that the sulfur dioxide is dissolved into the wastewater. Contact times less than one minute are generally required, and in the order of 30 seconds is generally adequate.

Suitable gas-liquid contacting apparatuses are described in U.S. Pat. Nos. 2,126,164, 3,017,951, 3,627,134, 3,775,314, 3,907,510, 4,039,289, 4,043,771, and 4,138,330.

The amount of sulfur dioxide that needs to be dissolved in the wastewater and introduced into the mixing zone 14 is that amount which insures that there is sufficient free sulfur dioxide in the treatment zone 24 to disinfect the wastewater in the treatment zone. Generally, at least about 10, and preferably at least about 30 milligrams of $SO_2$ are introduced into the mixing zone 14 per liter of wastewater introduced into the mixing zone. Generally no more than about 2000, and preferably no more than about 600 mg of sulfur dioxide per liter of waste water is required. The optimum amount of the total $SO_2$ added depends on the alkalinity of the wastewater. Wastewater generally has an alkalinity of no more than 800 mg/liter (*Standard Methods*, 14th Ed., APHA, 1975). As the alkalinity increases, more $SO_2$ is required.

Sufficient sulfur dioxide is introduced to the mixing zone 14 that the waste water in the treatment zone has a selected free SO₂ content of at least about 5 mg/liter, which is the minimum amount of free SO₂ required to insure that the wastewater is disinfected. This is the minimum amount of free SO₂ required to obtain substantially complete coliform disinfection in secondary treated sewage. To insure substantially complete disinfection, preferably the wastewater has a free SO₂ content of at least about 10 mg/liter. As the free SO₂ content is increased above about 200 mg/liter, little, if any improvement in disinfection is obtained. Therefore, preferably the amount of sulfur dioxide added into the mixing zone 14 is limited so that the free SO₂ content of the wastewater in the treatment zone is less than about 200, and more preferably, less than about 150 mg/liter. Optimumly, the free SO₂ content of the wastewater is about 30 mg/liter.

The SO₂ content of the wastewater in the treatment zone 24 is expressed herein in terms of "free" SO₂, rather than total SO₂, because it has been determined that "free" SO₂ is a better measure of coliform disinfection than is total SO₂. Free SO₂ is calculated from knowledge of the pH and total SO₂ of the wastewater. The pH of the wastewater is determined with a conventional pH water. The total SO₂ content of the wastewater is determined using the sulfite technique as described in *Standard Methods*, 14th edition, Pages 508–9 (APHA, 1975).

The calculation for free SO₂ utilizing total SO₂ and pH is based upon the reaction:

$$SO_2 + H_2O \rightleftharpoons H^+ + HSO_3^-.$$

The equilibrium constant $K_1$, for this reaction is about $1.72 \times 10^{-2}$ so that:

$$K_1 = \frac{[H^+][HSO_3^-]}{[SO_2]} = 1.72 \times 10^{-2}$$

Figure 5:
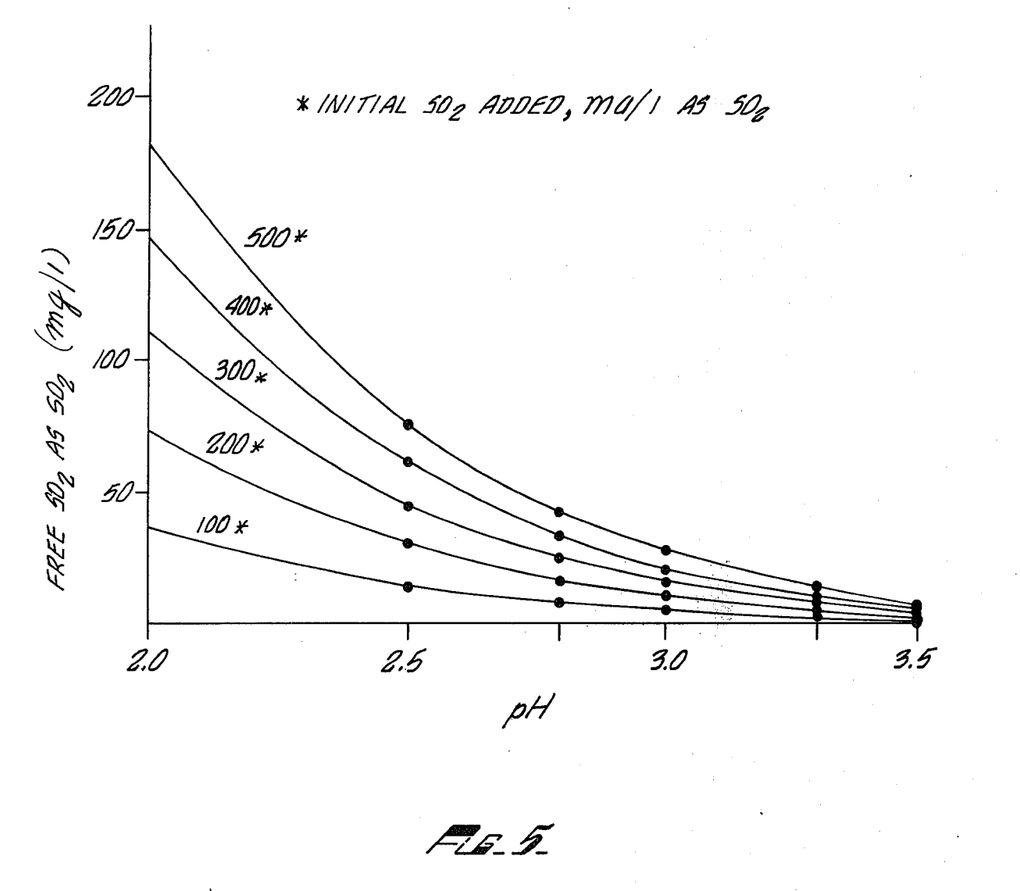
FIG. 5 presents calculated free $SO_2$ as a function of pH and the amount of total $SO_2$ added to water.

If it is assumed that $SO_3^{--}$ is negligible and $\gamma = 1.0$ for all ionic species, the free SO₂ can easily be calculated. FIG. 5 represents plots of the free SO₂ content versus pH for total SO₂ added to the wastewater per liter of waste water based on the assumption that all the SO₂ added is dissolved in the wastewater.

From the above equilibrium equations, it can be determined that the lower the pH of the wastewater (high [H⁺]), the lower the HSO₃⁻ content and the higher the free SO₂ content of the wastewater. Therefore, to obtain adquate free SO₂ in the wastewater, the pH of the wastewater in the treatment zone is maintained less than about 4, and preferably, less than about 3. The preferred range for the pH is from about 1 to about 4, and more preferably from about 2 to about 3, and the optimum value is about 2.5.

To reduce the pH of the wastewater, sufficient SO₂ can be added so that the pH and free SO₂ are at their respective desired values. Alternatively, an acid such as hydrochloric acid or sulfuric acid can be added to the wastewater to reduce the pH of the wastewater rather than relying just on the SO₂ to reduce the pH of the wastewater.

Sufficient residence time is required in the treatment zone to disinfect the wastewater. A residence time of at least about 10 minutes is required for adequate disinfection. Residence times in excess of about 60 minutes provide little, if any, improvement in disinfection. Therefore, preferably the residence time is from about 10 to about 60 minutes, more preferably the residence time is less than about 40 minutes, and optimumly the residence time is about 20 minutes.

The treatment zone 24 is not agitated so that substantially plug flow is maintained in the treatment zone. This is to insure that all of the wastewater is subjected to at least about 10 minutes of treatment by SO₂.

Unlike prior art processes, it is preferred in the process of the present invention that substantially no particulate iron be added to the wastewater so that there is substantially no particulate iron in the treatment zone. This is because the particulate iron can react to form FeSO₃ which would reduce the free SO₂ content of the wastewater and interfere with the disinfection process. The vessels and process equipment in the present invention can be fabricated of iron.

The treated wastewater withdrawn from the treatment zone is neutralized in the neutralization zone 28 with a neutralizing agent 30. The neutralizing agent 30 can be an alkaline material such as an alkaline metal hydroxide, carbonate, or oxide. The use of calcium oxide, as for example, in the form of lime is advantageous in that it leads to the formation of calcium sulfate, which, under proper pH conditions precipitates from the wastewater and can be removed from the system. The neutralizing agent can be added as a solid, as a slurry, or in solution.

In the neutralization zone, sufficient neutralization agent is added to increase the pH of the wastewater to be in the range of from about 6 to about 8, and optimumly to about 7.0, so that the wastewater can be discharged to the environment.

In the aeration zone 34, the neutralized treated wastewater is aerated with blown in air in an amount sufficent to raise its oxygen content, preferably to at least about 40 percent saturation. The addition of air strips out or reacts with any residual SO₂ and insures that the chemical oxygen demand and biochemical oxygen demand of the wastewater are reduced to required levels. Aeration can be obtained with equipment such as described in U.S. Pat. Nos. 2,126,164, 3,017,951, 3,775,314, 3,794,582, 4,043,771, and 4,138,330.

The disinfected water 36 discharged from the aerator can be safely discharged into streams, lakes, and other such bodies of water, and can be safely used for such industrial purposes as process cooling water.

Figure 2:
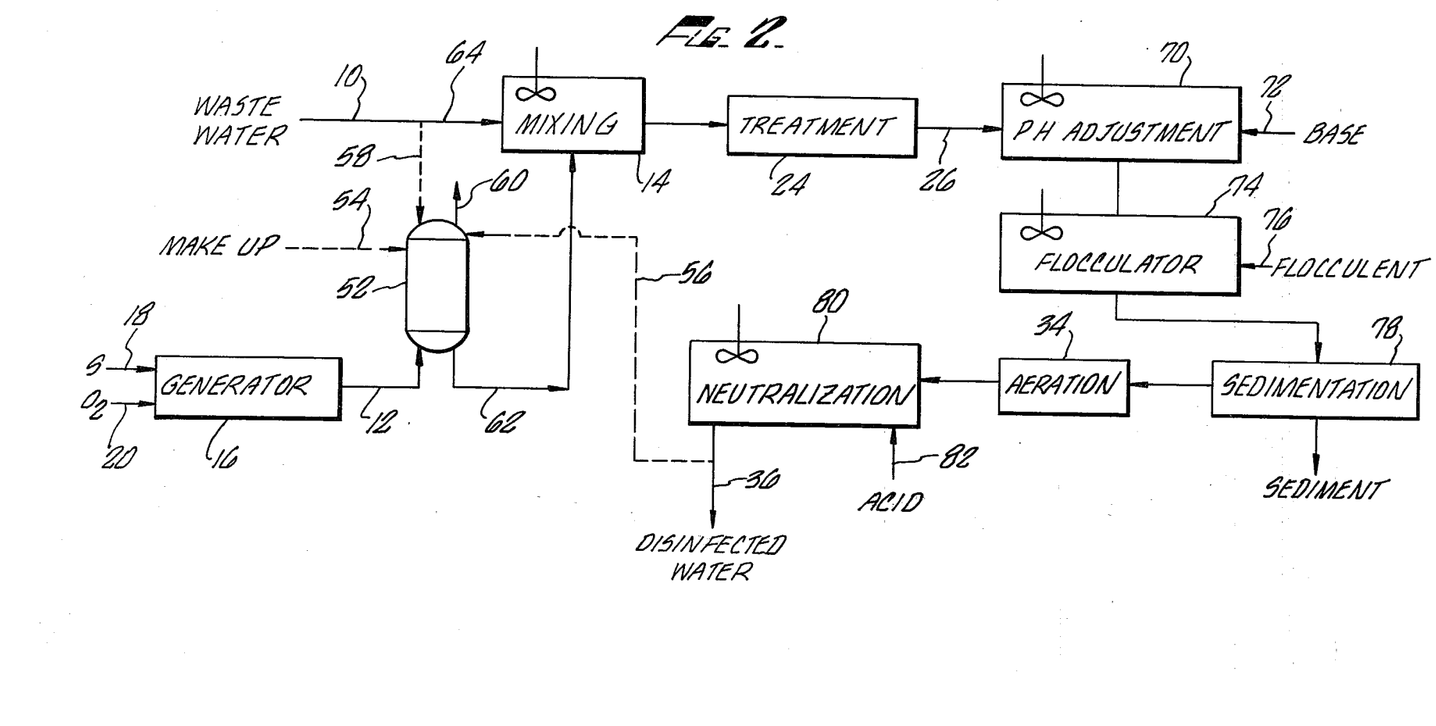
FIG. 2 is a flow sheet showing another version of the present invention.

An alternate version of the present invention is shown in FIG. 2. The version of FIG. 2 uses the same SO₂ generator 16, mixing zone 14, and treatment zone 24 used in the version shown in FIG. 1. The version shown in FIG. 2 differs from the version shown in FIG. 1 in two respects, either or both of which can be used with the version shown in FIG. 1.

The first difference is that the combustion gas 12 containing SO₂ is not introduced as a gas into the mixing zone 14. Instead, the SO₂ is first dissolved in water and the water containing SO₂ dissolved therein is introduced into the mixing zone 14.

As shown in FIG. 2, the combustion gas 12 containing SO₂ is introduced to the bottom of a tower 52. Water is introduced into the top of the tower 52. The water can be fresh makeup water 54, recycled disinfected water 56, and/or a first portion 58 of the wastewater 10. Preferably only a first portion 58 of the wastewater is used for introduction into the tower 52. Generally the first portion of the wastewater comprises from about 10 to about 70, and preferably from about 30 to 50, volume percent of the total wastewater stream 10.

Sufficient $SO_2$ is introduced into the gas-liquid contact zone 52 so that the wastewater 62 withdrawn from the contact zone has a free $SO_2$ content of at least 10 mg/liter, and preferably a free $SO_2$ content of from about 20 to about 300 mg/liter. The exact concentration of free $SO_2$ in the wastewater 62 withdrawn from the contact zone 52 will depend on the volume percent of wastewater 62 compared to the first portion of wastewater 10. As the volume percent of wastewater 62 increases, the concentration of free $SO_2$ in wastewater 62 decreases.

Any constituents of the combustion gas 12 not dissolved in the water in the tower 52 are released to the atmosphere via line 60. Water with $SO_2$ dissolved therein is withdrawn from the tower 52 via line 62 and introduced into the mixing zone 14 in which it is combined with a second portion 64 of the wastewater 10. As shown in FIG. 2, preferably none of the wastewater withdrawn from the contact zone 52 is recycled into the contact zone 52, i.e., it is introduced directly into the mixing zone 14.

An advantage of splitting the wastewater 10 into two streams 48 and 64 is that only a portion of the wastewater needs to be passed through the gas-liquid contactor 52. This helps minimize the fouling that can occur with a gas-liquid contactor 52 containing packing.

The amount of $SO_2$ introduced into the contact zone 52 is such that the wastewater in the mixing zone 14 has a free $SO_2$ content of at least about 5 mg/liter, but less than about 200 mg/liter, preferably from about 10 to about 150 mg/liter, and optimumly about 30 mg/liter.

The second difference between the version of the invention shown in FIG. 2 and the version shown in FIG. 1 is the processing of the treated wastewater 26 from the treatment zone 24. Rather than just neutralizing and aerating the treated wastewater 26, it is subjected to further processing to remove solids and nutrients. Contaminants are withdrawn from the wastewater 26 by increasing its pH in a pH adjustment zone 70 to at least about 8, and preferably in the range of from about 9 to about 12. This can be effected with a base 72, and preferably is effected with calcium oxide. The wastewater is then flocculated in a flocculator 74 to which can be added a flocculating agent 76 such as aluminum sulfate. Flocculated material is removed from the flocculated wastewater such as by centrifuging or settling in a sedimentation zone 78, which can be a conventional gravity settler or decanter.

After the solids are removed from the wastewater in the sedimentation zone 78, the water is aerated to raise its oxygen content, preferably to at least about 40 percent saturation in an aeration zone 34 and then neutralized in a neutralization zone 80 with an acid 82 such as hydrochloric acid or sulfuric acid to a pH of about 7.0.

The key to effective disinfection of wastewater is maintaining the free $SO_2$ content in the treatment zone 24 in a range from about 5 to about 200 mg/liter, and preferably in the range of from about 10 to about 150 mg/liter. This is effected by monitoring the free $SO_2$ content of the waste water in the treatment zone 24, and increasing and decreasing the amount of $SO_2$ used to treat the wastewater as required. The free $SO_2$ content of the wastewater can be monitored by direct measurement or by calculation from measured total $SO_2$ and measured pH.

The process of the present invention is generally operated at ambient temperature except for the burning of the sulfur. The process can normally be operated at any temperature normally found in wastewater. While the system can be operated at superatmospheric pressure, it is generally preferable because of energy considerations, to employ a gas-liquid contactor and wastewater and gas pressures such that excessive pressures at not encountered.

Further information regarding the disinfection of wastewater according to the present invention can be found in the report entitled "Evaluation of Sulfur Dioxide Dissinfection," Reynolds and Adams, Utah Water Research Laboratory, Utah State University, December, 1979, which is incorporated herein by this reference.

The process of the present invention will be better understood with reference to the following example:

EXAMPLE

This example shows the effect of the amount of $SO_2$ added to the wastewater and the effect of contact time on the coliform disinfection.

The wastewater samples used were secondary treated sewage from the Hyrum City Wastewater Treatment Plant, Hyrum, Utah. Twelve 500 ml Erlenmeyer flasks, each containing 500 ml undiluted secondary treated sewage, were placed on a magnetic stirrer. While stirring, concentrated sulfurous acid was added as the source of $SO_2$. The flasks were placed on a shaker table and mixed at 125 rpm for contact times of 3, 5, 10, and 20 minutes. The flasks were neutralized to a pH of 7.0 using 5 N NaOH. Membrane filter analyses for total and fecal coliform were performed on the neutralized samples (APHA 1975). In addition, the final $SO_2$ concentration was determined by titration according to *Standard Methods*, 14th edition (APHA, 1975). The final free $SO_2$ content was calculated from measured pH and the determined final $SO_2$ values.

Figure 3:
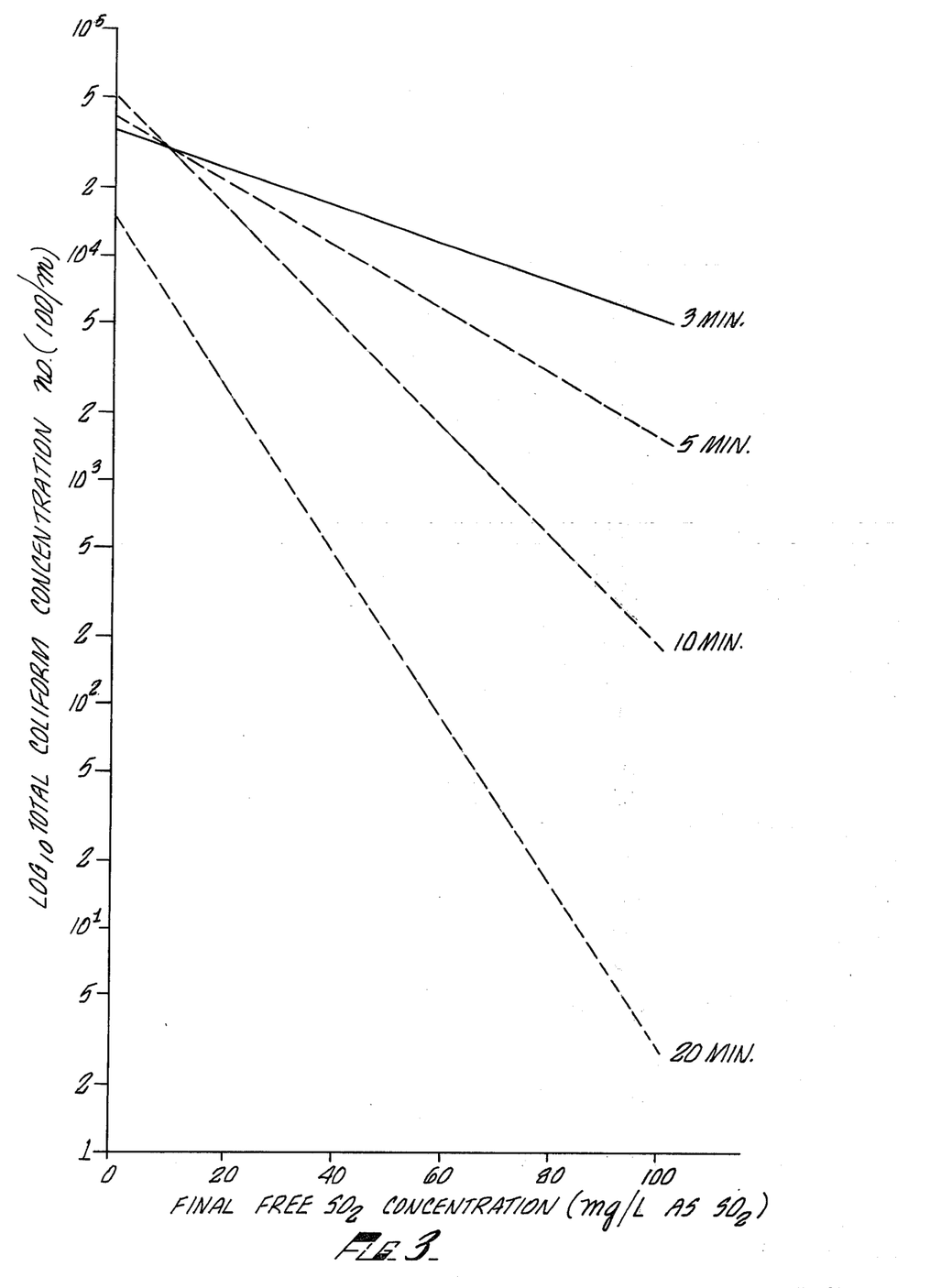
FIGS. 3 and 4 shows coliform disinfection using $SO_2$ on secondary treated sewage.
Figure 4:
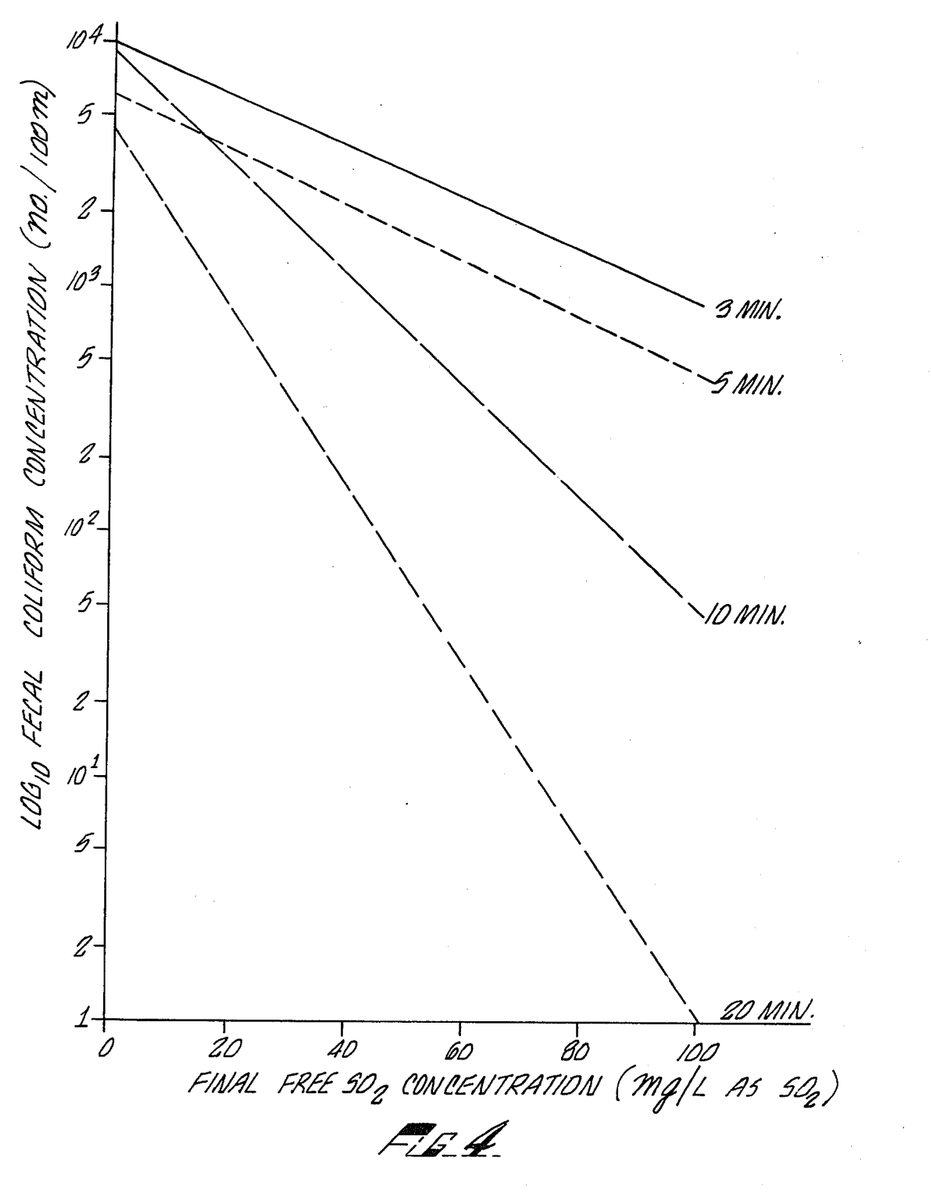

An exponential regression analysis was conducted on the results. FIG. 3 presents the $log_{10}$ total coliform concentration as a function of the final free $SO_2$ concentration for contact times of 3, 5, 10, and 20 minutes. FIG. 4 presents $log_{10}$ fecal coliform concentration versus final free $SO_2$ concentration for the same contact times. These curves are based upon the equation determined by regression analysis. The regression coefficient, r, for all the curves was in the range of from 0.81 to 0.94. All corelation coefficients are significant at the 1 percent level.

The 1985 State of Utah's Total Coliform Discharge Standard is 200 total coliform per 100 ml. From FIG. 3, it is evident that this standard can be satisfied with a contact time of 10 minutes and a free content of about 100 mg/liter of $SO_2$. With a contact time of 20 minutes, the total Coliform Standard can be satisfied with a free sulfur dioxide content of approximately 78 mg/liter as $SO_2$. (All $SO_2$ contents, including total and free $SO_2$ contents, expressed herein are based upon $SO_2$.) This results in a pH of approximately 2.8.

From FIG. 4, the 1985 State of Utah Coliform Discharge Standard of 20 fecal coliform per 100 ml is satisfied with a free sulfur dioxide content of about 62 mg/liter (with a resultant pH of approximately 2.6) and a contact time of about 20 minutes required.

The process of the present invention not only can meet the State of Utah's requirements, but also meets the 1983 Environmental Protection Agency's standards for water discharge for irrigation, recreation, and industrial use. It is based upon a fundamental understanding of how a process utilizing $SO_2$ for disinfecting wastewater is to be controlled and operated for efficient and effective disinfection. By controlling the process based upon the free $SO_2$ content of the treated wastewater, it is possible to ensure that coliform present in wastewater are disinfected. The disinfected water produced from the process is relatively clear and odor-free. Further, because chlorine is not used in the process, carcinogens produced with chlorine disinfection are not a problem.

Although the present invention has been described in considerable detail with reference to certain preferred versions thereof, other versions are possible. Therefore, the spirit and scope of the appended claims should not be necessarily limited to the description of the preferred versions contained herein.

What is claimed is:

1. A continuous process for disinfecting wastewater containing infectious microorganisms comprising the steps of:
   (a) combining the wastewater with sufficient $SO_2$ that the wastewater has a selected free $SO_2$ content no less than a selected free $SO_2$ content of at least about 5 mg/liter and less than about 200 mg/liter;
   (b) maintaining the combined $SO_2$/wastewater in a treatment zone at the selected free $SO_2$ content and at a pH of from about 1 to about 4 to about 10 to about 60 minutes; and
   (c) withdrawing wastewater from the treatment zone, the withdrawn wastewater containing substantially no infectious microorganisms.

2. The process of claim 1 in which the step of maintaining comprises maintaining the combined $SO_2$/wastewater at the selected free $SO_2$ content in the substantial absence of particulate iron.

3. The process of claim 1 in which the step of maintaining comprises maintaining the combined $SO_2$/wastewater at the selected free $SO_2$ content without agitation.

4. The process of claim 1 in which the combined $SO_2$/wastewater is maintained in the treatment zone for about 10 to about 40 minutes.

5. The process of claim 1 in which the selected free $SO_2$ content is at least about 10 mg/liter.

6. The process of claim 1 or 5 in which the selected free $SO_2$ content is less than about 150 mg/liter.

7. The process of claim 1 in which the combined $SO_2$/wastewater is maintained in the treatment zone at a pH of about 2 to about 3.

8. The process of claim 1 including the step of burning sulphur in the presence of no more than the amount of oxygen required to insure substantially complete oxidation of the sulphur to $SO_2$ to produce a combustion gas comprising $SO_2$ and no more than about 10% by volume oxygen.

9. The process of claim 8 wherein the step of combining comprises introducing the combustion gas without any additional oxygen into the wastewater.

10. The process of claim 1 in which the step of combining comprises contacting a first portion of the wastewater with gaseous $SO_2$ to dissolve $SO_2$ therein and mixing the first portion with $SO_2$ dissolved therein with a second portion of the wastewater.

11. The process of claim 1 in which the $SO_2$ is gaseous.

12. The process of claim 1 in which the step of combining comprises mixing the wastewater with $SO_2$ dissolved in water.

13. A continuous process for disinfecting wastewater containing coliform bacteria comprising the steps of:
   (a) combining the wastewater with sufficient $SO_2$ so that the wastewater has a selected free $SO_2$ content of from about 10 to about 150 mg/liter and a selected pH of from about 2 to about 3;
   (b) maintaining the combined $SO_2$/wastewater in a treatment zone at the selected free $SO_2$ content and the selected pH for about 10 to about 60 minutes;
   (c) withdrawing wastewater from the treatment zone, the withdrawn wastewater containing substantially no coliform bacteria; and
   (d) neutralizing the wastewater withdrawn from the treatment zone to a pH of from about 6 to about 8 and dissolving oxygen in the wastewater withdrawn from the treatment zone to raise its oxygen content.

14. A continuous process for disinfecting wastewater containing infectious microorganisms comprising the steps of:
   (a) combining the wastewater with from about 10 to about 2000 mg of $SO_2$ per liter of wastewater so that the wastewater has a selected free $SO_2$ content of from about 10 to about 200 mg/liter and a selected pH of from about 1 to less than about 3;
   (b) maintaining the combined $SO_2$ wastewater in a treatment zone at the selected free $SO_2$ content and the selected pH for about 10 to about 60 minutes; and
   (c) withdrawing wastewater from the treatment zone, the withdrawn wastewater containing substantially no infectious microorganisms.

15. The process of claim 14 in which the wastewater is combined with at least about 200 mg of $SO_2$ per liter of 16. The process of claim 14 or 15 in which the wastewater is combined with no more than about 600 mg of $SO_2$ per liter of wastewater.

17. A continuous process for disinfecting wastewater containing infectious microorganisms comprising the steps of:
   (a) introducing only a first portion of the wastewater and a $SO_2$ containing gas into a gas-liquid contact zone for dissolving at least a portion of the $SO_2$ into the first portion of the wastewater, the first portion being introduced directly into the gas-liquid contact zone;
   (b) withdrawing wastewater containing $SO_2$ from the contact zone;
   (c) combining a second portion of the wastewater with $SO_2$ by (i) introducing substantially all of the withdrawn wastewater containing $SO_2$ directly into a mixing zone and (ii) introducing the second portion of the wastewater into the mixing zone;
   (d) maintaining the combined withdrawn wastewater and the second portion of the wastewater in a treatment zone for about 10 to about 60 minutes at a pH of from about 1 to about 4; and
   (e) withdrawing treated wastewater from the treatment zone, the withdrawn treated wastewater containing substantially no infectious microorganisms;
   wherein sufficient $SO_2$ is introduced into the contact zone so the water in the treatment zone has a selected free $SO_2$ content of at least about 5 mg/liter and less than about 200 mg/liter.

18. The process of claim 1 or 17 in which the infectious microorganism is coliform bacteria.

19. The process of claim 17 in which sufficient $SO_2$ is introduced into the contact zone so that the wastewater in the treatment zone has a selected free $SO_2$ content of at least about 10 mg/liter.

20. The process of claims 17 or 19 in which the amount of $SO_2$ introduced into the contact zone is such that the wastewater in the treatment zone has a selected free $SO_2$ content of less than about 150 mg/liter.

21. The process of claim 17 in which sufficient $SO_2$ is introduced into the gas-liquid contact zone that the wastewater withdrawn from the contact zone has a free $SO_2$ contact of at least about 10 mg/liter.

22. The process of claim 17 or 21 in which the first portion of the wastewater comprises from about 10 to about 70 volume percent of the total wastewater.

23. The process of claim 17 including the step of introducing $SO_2$ containing gas into the mixing zone.

24. The process of claim 17 in which the step of maintaining comprises maintaining the contents of the treatment zone at the selected free $SO_2$ content in the substantial absence of particulate iron.

25. The process of claim 17 in which the step of maintaining comprises maintaining the contents of the treatment zone unagitated.

26. A continuous process for disinfecting wastewater containing coliform bacteria comprising the steps of:
    (a) introducing only a first portion of the wastewater and a $SO_2$ containing gas into a gas-liquid contact zone for dissolving at least a portion of the $SO_2$ into the first portion of the wastewater, the first portion being introduced directly into the gas-liquid contact zone;
    (b) withdrawing wastewater containing dissolved $SO_2$ from the contact zone;
    (c) combining a second portion of the wastewater with $SO_2$ by (i) introducing substantially all of the withdrawn wastewater containing $SO_2$ directly into a mixing zone and (ii) introducing the second portion of the wastewater into the mixing zone;
    (d) maintaining the combined withdrawn wastewater and the second portion of the wastewater in a treatment zone for a residence time of about 10 to about 60 minutes at a pH of from about 1 to about 4;
    (e) withdrawing wastewater containing substantially no coliform bacteria from the treatment zone; and
    (f) neutralizing the wastewater withdrawn from the treatment zone to a pH of from about 6 to about 8 and dissolving oxygen in the wastewater withdrawn from the treatment zone to raise its oxygen content, wherein sufficient $SO_2$ is introduced into the contact zone in that the wastewater in the treatment zone has a selected free $SO_2$ content of from about 10 to about 150 mg/liter.

27. A continuous process for disinfecting wastewater containing coliform bacteria comprising the steps of:
    (a) combining the wastewater with sufficient $SO_2$ so that the wastewater has (a) a free $SO_2$ content no less than a selected free $SO_2$ content of from about 10 to about 150 mg/liter and (b) a pH of from about 1 to about 4;
    (b) maintaining the combined $SO_2$/wastewater in a treatment zone at the selected free $SO_2$ content and the selected pH for about 10 to about 60 minutes;
    (c) withdrawing wastewater containing substantially no coliform bacteria from the treatment zone;
    (d) removing contaminants from the wastewater withdrawn from the treatment zone by increasing its pH to at least about 8, flocculating it, and removing flocculated material from the flocculated wastewater; and
    (e) neutralizing the flocculated wastewater and dissolvihng oxygen in the flocculated wastewater.

* * * * *

UNITED STATES PATENT AND TRADEMARK OFFICE
CERTIFICATE OF CORRECTION

PATENT NO. : 4,304,673
DATED : December 8, 1981
INVENTOR(S) : James H. Reynolds et al.

It is certified that error appears in the above—identified patent and that said Letters Patent is hereby corrected as shown below:

Column 1, line 18 change "be" to --lead to--;

Column 1, line 39 change "n" to --in--;

Column 2, line 18 change "30" to --10--;

Column 2, line 53 change "to" to --be--;

Column 3, line 7 change "shows" to --show--;

Column 3, lines 41 and 43 change "combination" to --combustion--;

Column 5, line 24 change "water" to --meter--;

Column 6, line 34 change "sufficent" to --sufficient--;

Column 8, line 5 change "at" to --are--;

Claim 1, line 10 change "to" (second occurrence) to --for--;

Claim 14, line 9 change "SO$_2$ wastewater" to --SO$_2$/wastewater--;

UNITED STATES PATENT AND TRADEMARK OFFICE
CERTIFICATE OF CORRECTION

PATENT NO. : 4,304,673
DATED : December 8, 1981
INVENTOR(S) : James H. Reynolds et al.

It is certified that error appears in the above—identified patent and that said Letters Patent is hereby corrected as shown below:

Claim 15, line 3 add --wastewater-- after "of";

Claim 27, lines 18 and 19, change "dissolvihng" to --dissolving--;

*Signed and Sealed this*

*Twenty-ninth* Day of *June 1982*

[SEAL]

Attest:

Attesting Officer

GERALD J. MOSSINGHOFF
Commissioner of Patents and Trademarks